(12) United States Patent
Bravo et al.

(10) Patent No.: US 12,232,160 B2
(45) Date of Patent: Feb. 18, 2025

(54) PREEMPTION MECHANISM FOR WLAN

(71) Applicant: Intel Corporation, Santa Clara, CA (US)

(72) Inventors: Daniel Bravo, Portland, OR (US); Laurent Cariou, Portland, OR (US); Thomas Kenney, Portland, OR (US); Robert Stacey, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 930 days.

(21) Appl. No.: 17/109,223

(22) Filed: Dec. 2, 2020

(65) Prior Publication Data

US 2021/0084667 A1 Mar. 18, 2021

(51) Int. Cl.
*H04W 84/12* (2009.01)
*H04W 48/10* (2009.01)
*H04W 72/56* (2023.01)

(52) U.S. Cl.
CPC ............ *H04W 72/56* (2023.01); *H04W 48/10* (2013.01); *H04W 84/12* (2013.01)

(58) Field of Classification Search
CPC ... H04W 72/56; H04W 72/569; H04W 48/10; H04W 84/12; H04W 74/0808; H04W 74/006; H04W 88/08
See application file for complete search history.

(56) References Cited

U.S. PATENT DOCUMENTS

| | | | |
|---|---|---|---|
| 2007/0248117 A1* | 10/2007 | Zuniga | H04W 72/20 370/468 |
| 2016/0212625 A1* | 7/2016 | Damnjanovic | H04W 74/0875 |
| 2018/0278454 A1* | 9/2018 | Islam | H04L 1/0038 |
| 2019/0075562 A1* | 3/2019 | Cariou | H04W 74/002 |
| 2019/0320454 A1* | 10/2019 | Li | H04L 1/1812 |
| 2020/0008216 A1* | 1/2020 | Iyer | H04W 72/23 |
| 2021/0392618 A1* | 12/2021 | Hedayat | H04W 72/20 |
| 2022/0159718 A1* | 5/2022 | Fang | H04W 74/0808 |
| 2023/0081745 A1* | 3/2023 | Xin | H04W 74/0816 370/328 |
| 2023/0142670 A1* | 5/2023 | Mohammad Soleymani | H04W 72/02 370/329 |

* cited by examiner

*Primary Examiner* — Meng Vang
*Assistant Examiner* — Hector Reyes
(74) *Attorney, Agent, or Firm* — East IP P.C.

(57) ABSTRACT

The application relates to a preemption mechanism for wireless local area networks (WLANs), and in particular provides a method, including: broadcasting information about a Transmission Opportunity (TXOP) on a wireless channel, wherein the TXOP includes two or more transmission durations and a preemption period exists between any two neighboring transmission durations of the two or more transmission durations; and pausing communicating on the wireless channel during the preemption period to give opportunity for one or more stations (STAs) to preempt the wireless channel to transmit high priority traffic.

21 Claims, 10 Drawing Sheets

PREEMPTION MECHANISM FOR WLAN

TECHNICAL FIELD

Embodiments of the present disclosure generally relate to wireless communication, and in particular, to a preemption mechanism for wireless local area networks (WLANs).

BACKGROUND

An Extremely High Throughput (EHT) network, also known as 802.11be network, achieves high throughput through a series of system features and various mechanisms. It has been demonstrated, through simulation and real world device testing, that low latency applications benefit strongly from small Transmission Opportunities (TXOPs) when operating under 802.11 protocols. Conversely, high throughput applications require long TXOPs so as to use network resources more efficiently.

In many scenarios, these two types of applications have to share a wireless channel and there does not exist a way to optimize each application when they share the wireless channel.

SUMMARY

An aspect of the disclosure provides a method, comprising: broadcasting information about a Transmission Opportunity (TXOP) on a wireless channel, wherein the TXOP comprises two or more transmission durations and a preemption period exists between any two neighboring transmission durations of the two or more transmission durations; and pausing communicating on the wireless channel during the preemption period to give opportunity for one or more stations (STAs) to preempt the wireless channel to transmit high priority traffic.

An aspect of the disclosure provides an apparatus, comprising processor circuitry configured to: broadcast information about a Transmission Opportunity (TXOP) on a wireless channel, wherein the TXOP comprises two or more transmission durations and a preemption period exists between any two neighboring transmission durations of the two or more transmission durations; and pause communicating on the wireless channel during the preemption period to give opportunity for one or more stations (STAs) to preempt the wireless channel to transmit high priority traffic.

An aspect of the disclosure provides a method, comprising: receiving information about a Transmission Opportunity (TXOP), wherein the TXOP comprises two or more transmission durations and a preemption period exists between any two neighboring transmission durations of the two or more transmission durations; and during the preemption period, preempting a wireless channel, which is originally occupied by a holder station (STA) of the TXOP, to transmit high priority traffic.

An aspect of the disclosure provides an apparatus, comprising processor circuitry configured to: receive information about a Transmission Opportunity (TXOP), wherein the TXOP comprises two or more transmission durations and a preemption period exists between any two neighboring transmission durations of the two or more transmission durations; and during the preemption period, preempt a wireless channel, which is originally occupied by a holder station (STA) of the TXOP, to transmit high priority traffic.

An aspect of the disclosure provides a computer readable medium storing instructions thereon, the instructions, when executed by one or more processors, cause the one or more processors to implement the above method.

BRIEF DESCRIPTION OF THE DRAWINGS

Embodiments of the disclosure will be illustrated, by way of example and not limitation, in conjunction with the figures of the accompanying drawings in which like reference numerals refer to similar elements and wherein.

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Figure 1:
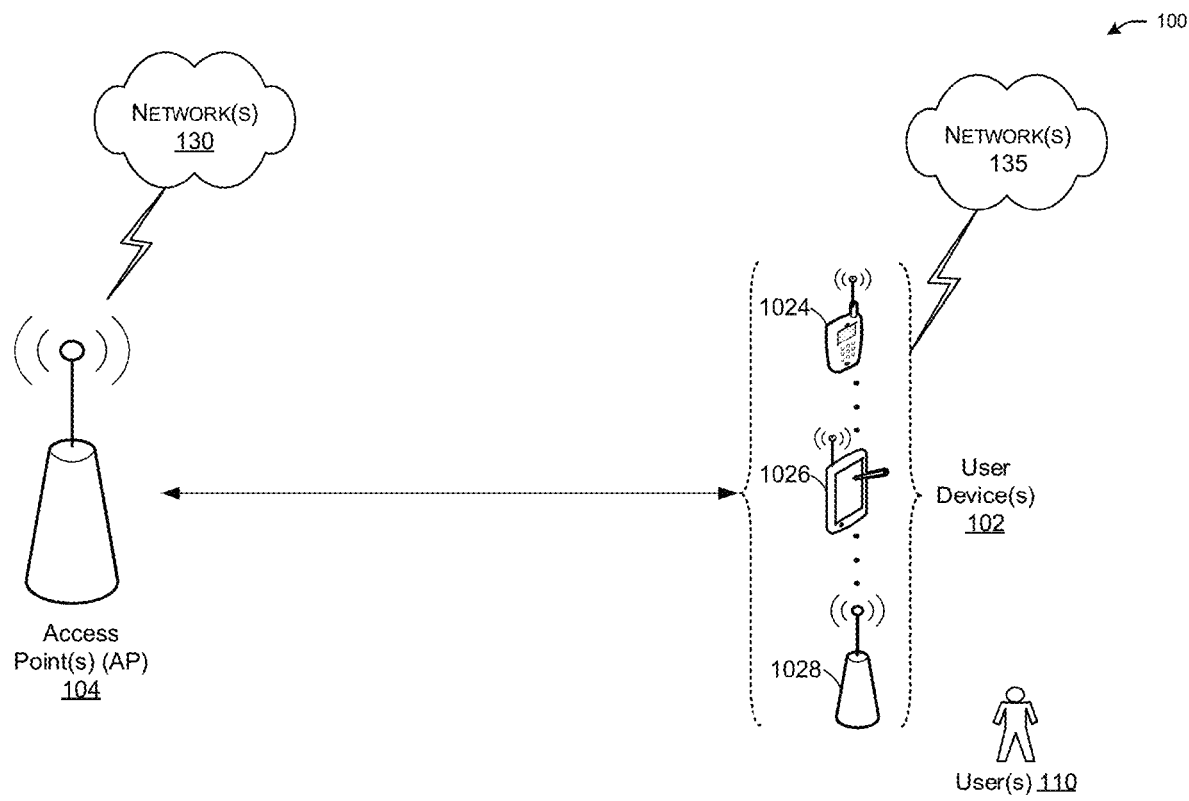
FIG. 1 is a network diagram illustrating an example network environment according to some embodiments of the disclosure.

FIG. 1 is a network diagram illustrating an example network environment according to some embodiments of the disclosure. As shown in FIG.1, a wireless network 100 may include one or more user devices 102 and one or more access points (APs) 104, which may communicate in accordance with IEEE 802.11 communication standards. The user devices 102 may be mobile devices that are non-stationary (e.g., not having fixed locations) or may be stationary devices.

Figure 5:
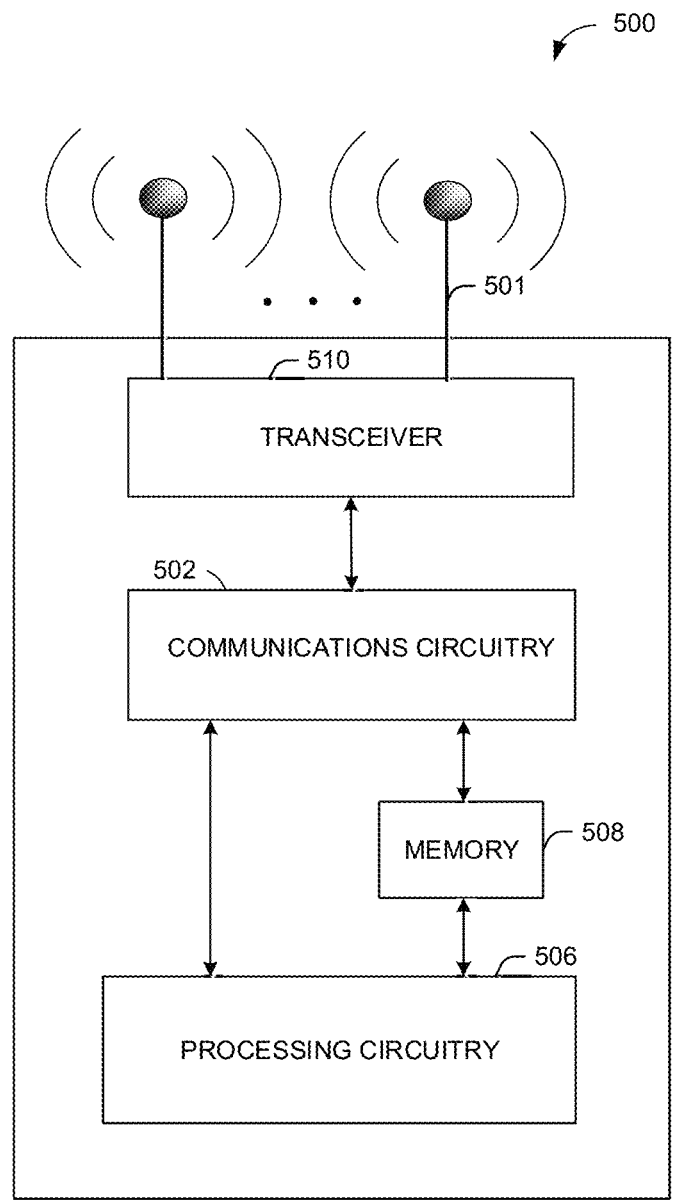
FIG. 5 is a functional diagram of an exemplary communication station 500, in accordance with one or more example embodiments of the disclosure.
Figure 6:
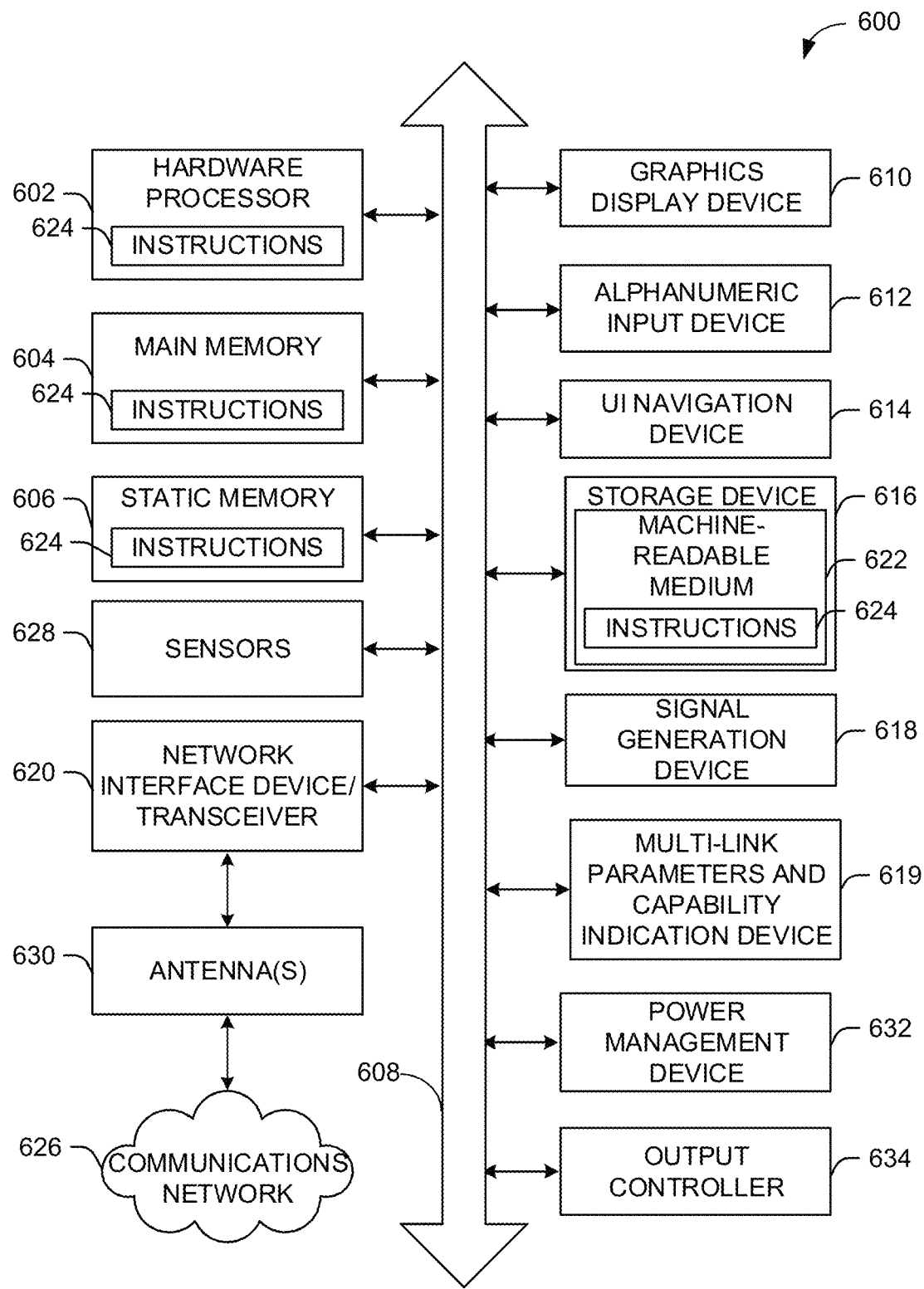
FIG. 6 is a block diagram of an example of a machine or system 600 upon which any one or more of the techniques (e.g., methodologies) discussed herein may be performed.

In some embodiments, the user devices 102 and APs 104 may include one or more function modules similar to those in the functional diagram of FIG. 5 and/or the example machine/system of FIG. 6.

The one or more user devices 102 and/or APs 104 may be operable by one or more users 110. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more user devices 102 and the one or more APs 104 may be STAs. The one or more user devices 102 and/or APs 104 may operate as a personal basic service set (PBSS) control point/access point (PCP/AP). The user devices 102 (e.g., 1024, 1026, or 1028) and/or APs 104 may include any suitable processor-driven device including, but not limited to, a mobile device or a non-mobile, e.g., a static device. For example, the user devices 102 and/or APs 104 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a personal digital assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communications service (PCS) device, a PDA device which incorporates a wireless communication device, a mobile or portable global positioning system (GPS) device, a digital video broadcasting (DVB) device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user devices 102 and/or APs 104 may also include mesh stations in, for example, a mesh network, in accordance with one or more IEEE 802.11 standards and/or 3GPP standards.

Any of the user devices 102 (e.g., user devices 1024, 1026, 1028) and APs 104 may be configured to communicate with each other via one or more communications networks 130 and/or 135 wirelessly or wired. The user devices 102 may also communicate peer-to-peer or directly with each other with or without APs 104. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 102 (e.g., user devices 1024, 1026, 1028) and APs 104 may include one or more communications antennas. The one or more communications antennas may be any suitable type of antennas corresponding to the communications protocols used by the user devices 102 (e.g., user devices 1024, 1026 and 1028) and APs 104. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 102 and/or APs 104.

Any of the user devices 102 (e.g., user devices 1024, 1026, 1028) and APs 104 may be configured to perform directional transmission and/or directional reception in conjunction with wirelessly communicating in a wireless network. Any of the user devices 102 (e.g., user devices 1024, 1026, 1028) and APs 104 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user devices 102 (e.g., user devices 1024, 1026, 1028) and APs 104 may be configured to perform any given directional transmission towards one or more defined transmit sectors. Any of the user devices 102 (e.g., user devices 1024, 1026, 1028) and APs 104 may be configured to perform any given directional reception from one or more defined receive sectors.

MIMO beamforming in a wireless network may be accomplished using radio frequency (RF) beamforming and/or digital beamforming. In some embodiments, in performing a given MIMO transmission, the user devices 102 and/or APs 104 may be configured to use all or a subset of its one or more communications antennas to perform MIMO beamforming.

Any of the user devices 102 (e.g., user devices 1024, 1026, 1028) and APs 104 may include any suitable radio and/or transceiver for transmitting and/or receiving radio frequency (RF) signals in the bandwidth and/or channels corresponding to the communications protocols utilized by any of the user devices 102 and APs 104 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

At present, in order to enable low latency applications and high throughput applications to share a wireless channel, one approach is to use restricted Target Wakeup Time (TWT), while another approach is to control TXOP limits based on Quality of Service (QoS), latency or other network characteristics. Each of these approaches favor on application over the other.

However, restricted TWT does not work well for the low latency applications as they are less predictable, and controlled TXOP limits will benefit the low latency applications but will the harm high throughput applications.

Solutions are proposed to optimize the low latency applications and the high throughput applications while they share the wireless channel. In particular, it is proposed to define a TXOP that can be a larger value than today, but with a requirement to create a preemption period between transmission durations within the TXOP to give opportunity for high priority traffic to preempt the wireless channel during the TXOP.

In some embodiments, the TXOP may be for example, 6 ms, 8 ms, 10 ms and so on and includes two or more transmission durations. The preemption period may exist between any two neighboring transmission durations of the two or more transmission durations. In other words, the TXOP may include two or more TXOPs of a short duration and one or more preemption periods may be positioned between any two or more neighboring TXOPs. In practice, each of the two or more transmission durations may be a TXOP of 2 ms.

Figure 2:
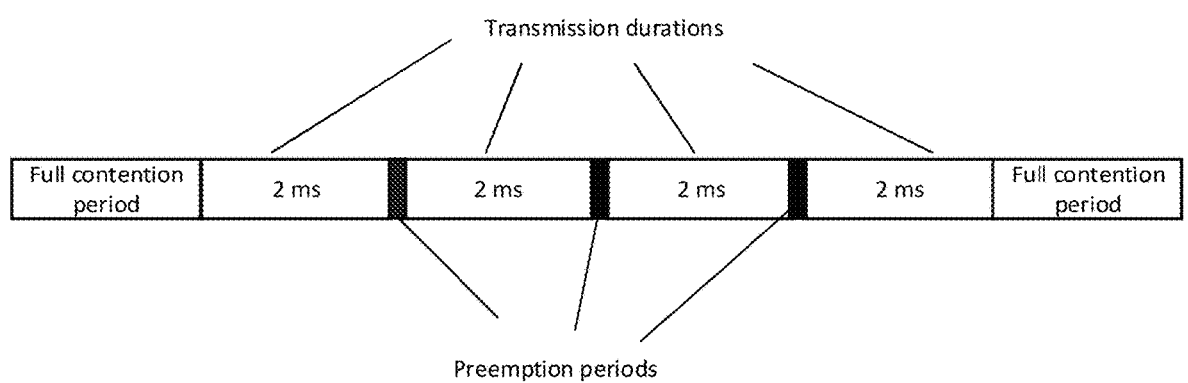
FIG. 2 is a diagram showing a structure of a TXOP according to some embodiments of the disclosure.

FIG. 2 is a diagram showing a structure of a TXOP according to some embodiments of the disclosure. As shown in FIG. 2, in some embodiments, the TXOP includes four transmission durations, each of which is 2 ms, there is a preemption period between every two neighboring transmission durations, and the preemption period may be a duration which is very short so that only a STA having very high priority traffic to transmit could gain the wireless channel during the preemption period.

It should be appreciated that during the preemption period, a holder STA of the TXOP would pause communicating over the wireless channel and a contention period would start to allow for one or more STAs to contend for the wireless channel to transmit high priority traffic.

Figure 3:
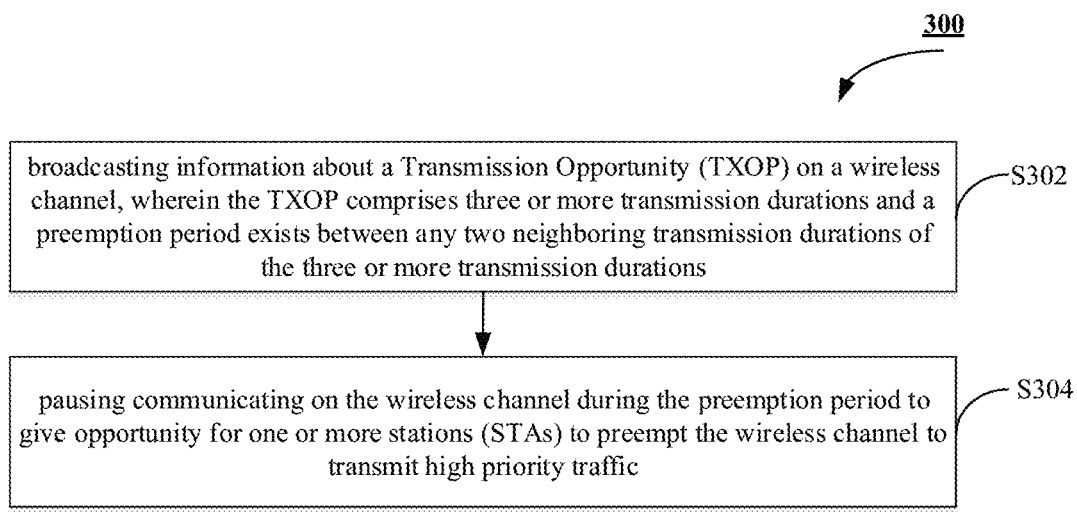
FIG. 3 is a flowchart showing a method 300 according to some embodiments of the disclosure.

FIG. 3 is a flowchart showing a method 300 according to some example embodiments of the disclosure. As shown in FIG. 3, the method 300 may include: S302, broadcasting information about a Transmission Opportunity (TXOP) on a wireless channel, wherein the TXOP comprises two or more transmission durations and a preemption period exists between any two neighboring transmission durations of the two or more transmission durations; and S304, pausing communicating on the wireless channel during the preemption period to give opportunity for one or more stations (STAs) to preempt the wireless channel to transmit high priority traffic.

In some embodiments, the method 300 may be implemented by an AP STA or a non-AP STA to optimize low latency applications and high throughput applications when the two types of application share the wireless channel. In other words, the method 300 may be implemented by a holder STA of the TXOP, and the holder STA of the TXOP may be an AP STA or a non-AP STA.

In some embodiments, during the preemption period, mechanisms may also be defined to limit the number of users that can compete to access the wireless channel:

- Only AP STAs are granted the right to contend for the wireless channel (the AP STAs would then possibly trigger Uplink (UL) communication if there is urgent traffic is in UL).
- Only a predefined set of non-AP STAs are granted the right to contend for the wireless channel.
- All non-AP STAs can contend for the wireless channel but only for some Access Categories (ACs), for example, a voice access category.
- A mix of AP STAs and non-AP STAs can contend for the wireless channel, but different rules for backoff are assigned for the AP STAs and the non-AP STAs, i.e., a lower backoff counter for the AP STAs to prioritize them.

In other words, in some embodiments, the one or more STAs preempting the wireless channel are all AP STAs, a predefined set of non-AP STAs, or non-AP STAs for one or more predetermined ACs. Alternatively, the one or more STAs preempting the wireless channel may include AP STAs and non-AP STAs and a backoff counter of the AP STAs is lower than that of the non-AP STAs.

In some embodiments, if no STAs gained the wireless channel during the preemption period, the holder STA of the TXOP still holds the TXOP. That is, the method 300 may further include: when none of the one or more STAs gains the wireless channel during the preemption period, continuing to communicate on the wireless channel by using remaining transmission durations of the TXOP after the preemption period expires.

In some embodiments, the method 300 may further includes: setting a Network Allocation Vector (NAV) to a duration of the whole of the TXOP or 2 ms; and broadcasting information about the NAV along with the information about the TXOP. The NAV is used by the holder STA of the TXOP to notify all STAs monitoring the wireless channel of its estimated duration of "current transmission".

In some embodiments, when any of the one or more STAs gains the wireless channel during the preemption period and the NAV is set to 2 ms, the method 300 may further includes: dropping the TXOP and contending for the wireless channel at the end of a new TXOP hold by the STA. That is, if a STA gains the wireless channel during the preemption period, the STA becomes a holder STA of a new TXOP, a duration of the new TXOP may be limited in time (for example, 2 ms), and a regular contention period starts at the end of the new TXOP.

In some embodiments, when any of the one or more STAs gains the wireless channel during the preemption period and the NAV is set to the duration of the whole of the TXOP, the method 300 may further include: receiving a short management frame sent by the STA and then continuing to communicate on the wireless channel by using remaining transmission durations of the TXOP, wherein the short management frame indicates that the STA has completed communication on the wireless channel. That is, if a STA gains the wireless channel during the preemption period, the STA becomes a holder STA of a new TXOP in a max allowed duration and would explicitly give back the wireless channel to the holder STA of the TXOP through a signaling (for example, a short management frame).

In some embodiments, the method 300 may further include: when none of the one or more STAs accesses the wireless channel after a first predetermined time from the start of the preemption period, determining that none of the one or more STAs gains the wireless channel during the preemption period. That is, if none of the one or more STAs accesses the wireless channel after the first predetermined time (for example, Short Interframe Space (SIFS)+2 slots) from the start of the preemption period, the holder STA of the TXOP regains the wireless channel.

In some embodiments, the method 300 may further include: when a Clear Channel Assessment (CCA) result for the wireless channel indicates that the wireless channel is idle after a second predetermined time from the start of the preemption period, determining that none of the one or more STAs gains the wireless channel during the preemption period. That is, if a CCA result, which include an Energy Detection (ED) result, a Packet Detection (PD) result, or a combination thereof, indicates that the wireless channel is idle after for example, 25 us from the start of the preemption period, the holder STA of the TXOP still holds the TXOP.

Figure 4:
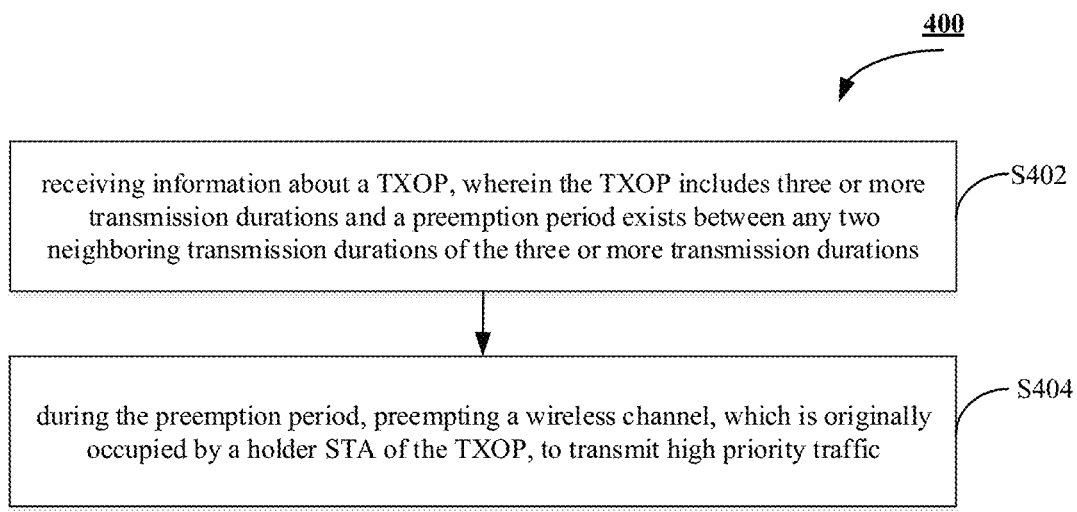
FIG. 4 is a flowchart showing another method 400 according to some embodiments of the disclosure.

FIG. 4 is a flowchart showing another method 400 according to some embodiments of the disclosure. As shown in FIG. 4, the method 400 may include: S402, receiving information about a TXOP, wherein the TXOP includes two or more transmission durations and a preemption period exists between any two neighboring transmission durations of the two or more transmission durations; and S404, during the preemption period, preempting a wireless channel, which is originally occupied by a holder STA of the TXOP, to transmit high priority traffic.

In some embodiments, the method 400 may be implemented by an AP STA or a non-AP STA to optimize low latency applications and high throughput applications when the two types of application share the wireless channel. In other words, the method 400 may be implemented by a competing STA having high priority traffic to transmit.

In some embodiments, the method 400 may further include: receiving information about a Network Allocation Vector (NAV) along with the information about the TXOP. The NAV may be set to a duration of the whole of the TXOP or 2 ms and broadcasted by the holder STA of the TXOP in order to notify all STAs monitoring the wireless channel of its estimated duration of "current transmission".

In some embodiments, the method 400 may further include: when the wireless channel is preempted, communicating on the wireless channel by using a new TXOP. The new TXOP may be 2 ms, and the method 400 may further include: setting a new NAV to 2 ms.

In some embodiments, when the NAV is the duration of the whole of the TXOP, the method 400 may further include: transmitting a short management frame to the holder STA of the TXOP after completing communication on the wireless channel by using the new TXOP, such that the holder STA of the TXOP continues to communicate on the wireless channel by using remaining transmission durations of the TXOP.

In some embodiments, the preempting comprises transmitting data on the wireless channel when a backoff counter of the competing STA reaches zero, and the backoff counter starts to decrease after a third predetermined time from the start of the preemption period. That is, when a short contention period during the preemption period is long enough to allow for collision avoidance, the preempting may be completed by a one-step contention, i.e., by doing a regular backoff procedure (for example, a EDCA procedure) and sending a packet to start occupying the wireless channel when the backoff counter reaches zero (like a regular contention period). In this case, there may be chances of collisions, especially if there are multiple STAs preempting the wireless channel. In order to reduce the collisions, the transmitting may be implemented following a Request To Send (RTS)/Clear To Send (CTS) handshake process.

In some embodiments, the preempting may include: broadcasting a frame containing a Short Training Field (STF), the STF and a Long Training Field (LTF), or a full legacy preamble including the STF, the LTF and a signal field (SIG) after a fourth predetermined time from the start of the preemption period; and transmitting data on the wireless channel when the backoff counter of the competing STA reaches zero, wherein the backoff counter starts to decrease after a fifth predetermined time from the start of the preemption period. That is, when the short contention period during the preemption period is very short, the preempting may be implemented using a two-step contention.

In some embodiments, during a first contention, the competing STA may simply send the frame including STF (8 us), STF+LTF, or a full legacy preamble (STF+LTF+SIG) during a slot after SIFS to interrupt the TXOP. The frame is basically a signal that is as short as possible which still giving sufficient detection probabilities (ED and/or PD).

In some embodiments, in a very optimized mode, there could even be no backoff procedures during the first contention and some competing STAs that have high priority traffic to transmit and are eligible to contend for the wireless channel would transmit a frame including only STF after a predetermined time (for example, SIFS) from the start of the preemption period. Other competing STAs receiving the frame including only STF would get a CCA result indicating that the wireless channel is busy and would stop contending for the wireless channel. If the holder STA of the TXOP (that stopped its TXOP to offer the preemption period) didn't receive the frame including only STF before the end of the preemption period, it would be able to use the wireless channel again and still uses the TXOP. If the holder STA of the TXOP receives the frame including only STF during the preemption period, it would lose the TXOP and not transmit at the end of the duration of the first contention so that a second contention happens between the competing STAs that gained access to the wireless channel during the first contention.

In some embodiments, during the second contention, only the competing STAs that gained access to the wireless channel during the first contention would have a full Enhanced Distributed Channel Access (EDCA) backoff procedure to contend for the wireless channel. Like a normal EDCA backoff procedure, the competing STA would gain the wireless channel when its backoff counter reaches zero with CCA result indicating that the wireless channel is idle.

In some embodiments, the first contention lasts 25 us. If the CCA result at the holder STA of the TXOP indicates that the wireless channel is idle after 25 us from the start of the preemption period, the holder STA of the TXOP continues to communicate on the wireless channel by using remaining transmission durations of the TXOP.

In some embodiments, the holder STA of the TXOP may, during the short contention period of the preemption period, detect the presence of the frame including STF, or STF+LTF, or the full legacy preamble in order to get the CCA result at the holder STA of the TXOP. That is, the method 300 may further include: detecting the frame including STF, or STF+LTF, or the full legacy preamble; and obtaining the CCA result based on the frame. Similarly, the competing STA may also, during the short contention period of the preemption period, detect the presence of the frame including STF, or STF+LTF, or the full legacy preamble in order to get the CCA result at the competing STA for use in for example, the EDCA backoff procedure.

It should be appreciated that the method 300 and the method 400 may be implemented in WLANs complying with 802.11 standards including 802.11be.

FIG. 5 shows a functional diagram of an exemplary communication station 500, in accordance with one or more example embodiments of the disclosure. In one embodiment, FIG. 5 illustrates a functional block diagram of a communication station that may be suitable for use as the AP 104 (FIG. 1) or the user device 102 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for transmitting and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be a liquid crystal display (LCD) screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

FIG. 6 illustrates a block diagram of an example of a machine or system 600 upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a multi-link parameters and capability indication device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the multi-link parameters and capability indication device 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The multi-link parameters and capability indication device 619 may carry out or perform any of the operations and processes (e.g., methods 300 and 400) described and shown above.

It is understood that the above are only a subset of what the multi-link parameters and capability indication device 619 may be configured to perform and that other functions included throughout this disclosure may also be performed by the multi-link parameters and capability indication device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
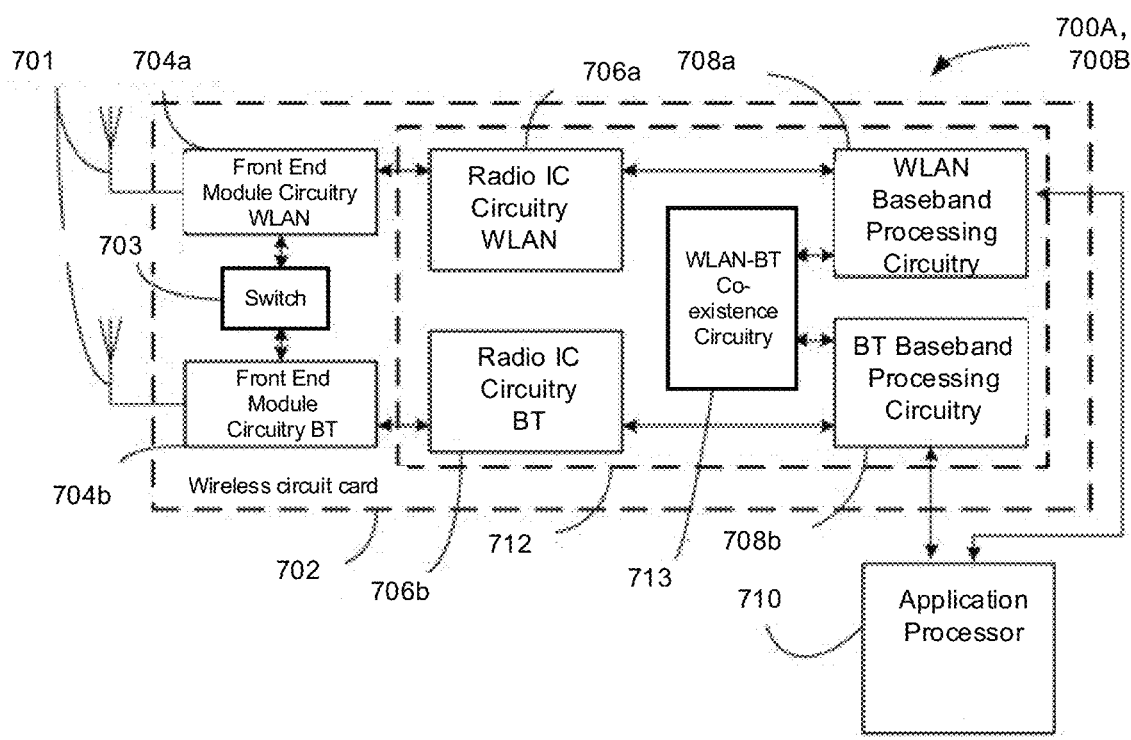
FIG. 7 is a block diagram of a radio architecture 700A, 700B in accordance with some embodiments that may be implemented in any one of APs 104 and/or the user devices 102 of FIG. 1.

FIG. 7 is a block diagram of a radio architecture 700A, 700B in accordance with some embodiments that may be implemented in any one of APs 104 and/or the user devices 102 of FIG. 1. Radio architecture 700A, 700B may include radio front-end module (FEM) circuitry 704a-b, radio IC circuitry 706a-b and baseband processing circuitry 708a-b. Radio architecture 700A, 700B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704a-b and the radio IC circuitry 706a-b may be provided on a single radio card. In some other embodiments, the radio IC circuitry 706a-b and the baseband processing circuitry 708a-b may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 700A, 700B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 700A, 700B may be part of a Wi-Fi communication station (STA) such as a wireless access point (AP), a base station or a mobile device including a Wi-Fi device. In some of these embodiments, radio architecture 700A, 700B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 700A, 700B may also be suitable to transmit and/or receive communications in accordance with other techniques and standards.

In some embodiments, the radio architecture 700A, 700B may be configured for high-efficiency Wi-Fi (HEW) communications in accordance with the IEEE 802.11ax standard. In these embodiments, the radio architecture 700A, 700B may be configured to communicate in accordance with an OFDMA technique, although the scope of the embodiments is not limited in this respect.

In some other embodiments, the radio architecture 700A, 700B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 7, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 700A, 700B may include other radio cards, such as a cellular radio card configured for cellular (e.g., 5GPP such as LTE, LTE-Advanced or 5G communications).

In some IEEE 802.11 embodiments, the radio architecture 700A, 700B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 720 MHz channel bandwidth may be used. The scope of the embodiments is not limited with respect to the above center frequencies however.

Figure 8:
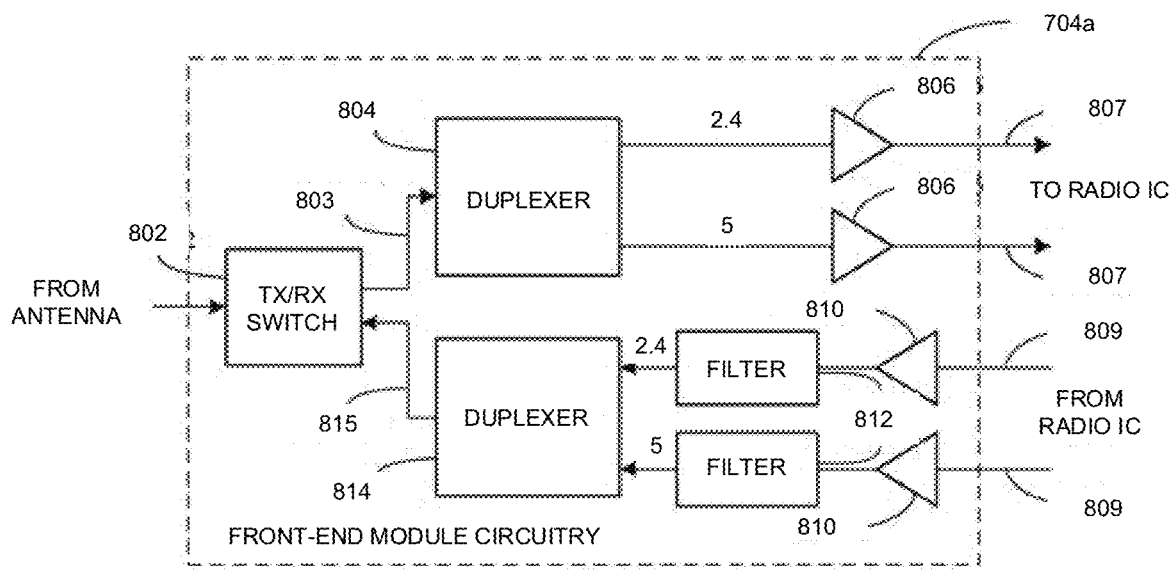
FIG. 8 illustrates WLAN FEM circuitry 704a in accordance with some embodiments.

FIG. 8 illustrates WLAN FEM circuitry 704a in accordance with some embodiments. Although the example of FIG. 8 is described in conjunction with the WLAN FEM circuitry 704a, the example of FIG. 8 may be described in conjunction with the example BT FEM circuitry 704b (FIG. 7), although other circuitry configurations may also be suitable.

In some embodiments, the FEM circuitry 704a may include a TX/RX switch 802 to switch between transmit mode and receive mode operation. The FEM circuitry 704a may include a receive signal path and a transmit signal path. The receive signal path of the FEM circuitry 704a may include a low-noise amplifier (LNA) 806 to amplify received RF signals 803 and provide the amplified received RF signals 807 as an output (e.g., to the radio IC circuitry 706a-b (FIG. 7)). The transmit signal path of the circuitry 704a may include a power amplifier (PA) to amplify input RF signals 809 (e.g., provided by the radio IC circuitry 706a-b), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704a may be configured to operate in either the 2.4 GHz frequency spectrum or the 5 GHz frequency spectrum. In these embodiments, the receive signal path of the FEM circuitry 704a may include a receive signal path duplexer 804 to separate the signals from each spectrum as well as provide a separate LNA 806 for each spectrum as shown. In these embodiments, the transmit signal path of the FEM circuitry 704a may also include a power amplifier 810 and a filter 812, such as a BPF, an LPF or another type of filter for each frequency spectrum and a transmit signal path duplexer 814 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704a as the one used for WLAN communications.

Figure 9:
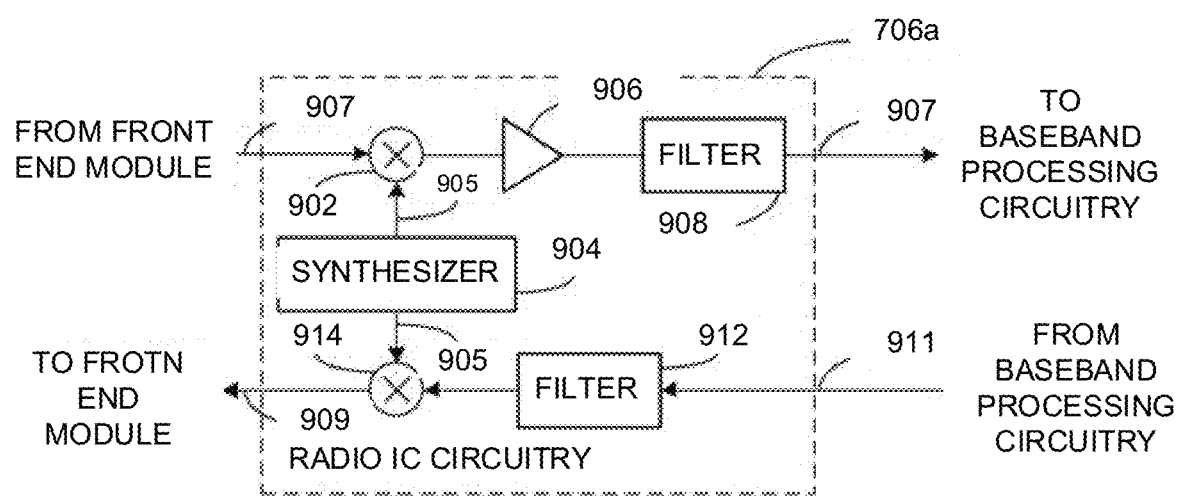
FIG. 9 illustrates radio IC circuitry 706a in accordance with some embodiments.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be transmitted to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example security signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
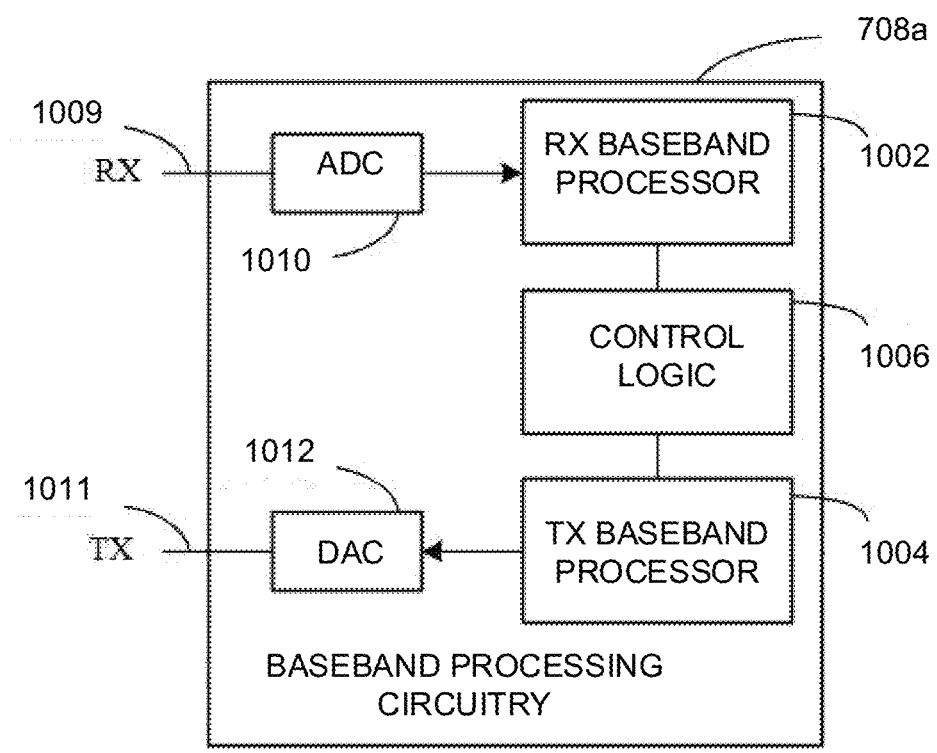
FIG. 10 illustrates a functional block diagram of baseband processing circuitry 708a in accordance with some embodiments.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 10 may be used to implement the example BT baseband processing circuitry 708b of FIG. 7.

The baseband processing circuitry 708a may include a receive baseband processor (RX BBP) 1002 for processing receive baseband signals 1009 provided by the radio IC circuitry 706a-b (FIG. 7) and a transmit baseband processor (TX BBP) 1004 for generating transmit baseband signals 1011 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 700A, 700B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following paragraphs describe examples of various embodiments.

Example 1 includes a method, comprising: broadcasting information about a Transmission Opportunity (TXOP) on a wireless channel, wherein the TXOP comprises two or more transmission durations and a preemption period exists between any two neighboring transmission durations of the two or more transmission durations; and pausing communicating on the wireless channel during the preemption period to give opportunity for one or more stations (STAs) to preempt the wireless channel to transmit high priority traffic.

Example 2 includes the method of Example 1, wherein the one or more STAs are all Access Point (AP) STAs, a predefined set of non-AP STAs, or non-AP STAs for one or more predetermined Access Categories (ACs).

Example 3 includes the method of Example 1, wherein the one or more STAs comprise Access Point (AP) STAs and non-AP STAs and a backoff counter of the AP STAs is lower than that of the non-AP STAs.

Example 4 includes the method of Example 1, wherein each of the two or more transmission durations is 2 ms and the method further comprises: setting a Network Allocation Vector (NAV) to a duration of the whole of the TXOP or 2 ms; and broadcasting information about the NAV along with the information about the TXOP.

Example 5 includes the method of Example 1, further comprising: when none of the one or more STAs gains the wireless channel during the preemption period, continuing to communicate on the wireless channel by using remaining transmission durations of the TXOP after the preemption period expires.

Example 6 includes the method of Example 4, wherein when any of the one or more STAs gains the wireless channel during the preemption period and the NAV is set to 2 ms, the method further comprises: dropping the TXOP and contending for the wireless channel at the end of a new TXOP hold by the STA.

Example 7 includes the method of Example 4, wherein when any of the one or more STAs gains the wireless channel during the preemption period and the NAV is set to the duration of the whole of the TXOP, the method further comprises: receiving a short management frame sent by the STA and then continuing to communicate on the wireless channel by using remaining transmission durations of the TXOP, wherein the short management frame indicates that the STA has completed communication on the wireless channel.

Example 8 includes the method of Example 1, further comprising: when none of the one or more STAs accesses the wireless channel after a first predetermined time from the start of the preemption period, determining that none of the one or more STAs gains the wireless channel during the preemption period.

Example 9 includes the method of Example 1, further comprising: when a Clear Channel Assessment (CCA) result for the wireless channel indicates that the wireless channel is idle after a second predetermined time from the start of the preemption period, determining that none of the one or more STAs gains the wireless channel during the preemption period.

Example 10 includes the method of Example 9, further comprising: detecting a frame containing a Short Training Field (STF), the STF and a Long Training Field (LTF), or a full legacy preamble comprising the STF, the LTF and a signal field (SIG); and obtaining the CCA result for the wireless channel based on the frame including STF, the STF and the LTF, or the full legacy preamble.

Example 11 includes a method, comprising: receiving information about a Transmission Opportunity (TXOP), wherein the TXOP comprises two or more transmission durations and a preemption period exists between any two neighboring transmission durations of the two or more transmission durations; and during the preemption period, preempting a wireless channel, which is originally occupied by a holder station (STA) of the TXOP, to transmit high priority traffic.

Example 12 includes the method of Example 11, further comprising: receiving information about a Network Allocation Vector (NAV) along with the information about the TXOP.

Example 13 includes the method of Example 11, further comprising: when the wireless channel is preempted, communicating on the wireless channel by using a new TXOP.

Example 14 includes the method of claim 13, wherein the new TXOP is 2 ms.

Example 15 includes the method of claim 14, further comprising: setting a new Network Allocation Vector (NAV) to 2 ms.

Example 16 includes the method of Example 15, wherein when the NAV is a duration of the whole of the TXOP, the method further comprises: transmitting a short management frame to the holder STA of the TXOP after completing communication on the wireless channel by using the new TXOP, such that the holder STA of the TXOP continues to communicate on the wireless channel by using remaining transmission durations of the TXOP.

Example 17 includes the method of Example 11, wherein the method is implemented in a competing STA, the preempting comprises transmitting data on the wireless channel when a backoff counter of the competing STA reaches zero, and the backoff counter starts to decrease after a third predetermined time from the start of the preemption period.

Example 18 includes the method of Example 17, wherein the transmitting is implemented following a Request To Send (RTS)/Clear To Send (CTS) handshake process.

Example 19 includes the method of Example 11, wherein the method is implemented by a competing STA, and the preempting comprises: broadcasting a frame containing a Short Training Field (STF), the STF and a Long Training Field (LTF), or a full legacy preamble comprising the STF, the LTF and a signal field (SIG) after a fourth predetermined time from the start of the preemption period; and transmitting data on the wireless channel when a backoff counter of the competing STA reaches zero, wherein the backoff counter starts to decrease after a fifth predetermined time from the start of the preemption period.

Example 20 includes an apparatus, comprising processor circuitry configured to: broadcast information about a Transmission Opportunity (TXOP) on a wireless channel, wherein the TXOP comprises two or more transmission durations and a preemption period exists between any two neighboring transmission durations of the two or more transmission durations; and pause communicating on the wireless channel during the preemption period to give opportunity for one or more stations (STAs) to preempt the wireless channel to transmit high priority traffic.

Example 21 includes the apparatus of Example 20, wherein the one or more STAs are all Access Point (AP) STAs, a predefined set of non-AP STAs, or non-AP STAs for one or more predetermined Access Categories (ACs).

Example 22 includes the apparatus of Example 20, wherein the one or more STAs comprise Access Point (AP) STAs and non-AP STAs and a backoff counter of the AP STAs is lower than that of the non-AP STAs.

Example 23 includes the apparatus of Example 20, wherein each of the two or more transmission durations is 2 ms and the processor circuitry is further configured to: set a Network Allocation Vector (NAV) to a duration of the whole of the TXOP or 2 ms; and broadcast information about the NAV along with the information about the TXOP.

Example 24 includes the apparatus of Example 20, wherein the processor circuitry is further configured to: when none of the one or more STAs gains the wireless channel during the preemption period, continue to communicate on the wireless channel by using remaining transmission durations of the TXOP after the preemption period expires.

Example 25 includes the apparatus of Example 23, wherein the processor circuitry is further configured to: when any of the one or more STAs gains the wireless channel during the preemption period and the NAV is set to 2 ms, drop the TXOP and contend for the wireless channel at the end of a new TXOP hold by the STA.

Example 26 includes the apparatus of Example 23, wherein the processor circuitry is further configured to: when any of the one or more STAs gains the wireless channel during the preemption period and the NAV is set to the duration of the whole of the TXOP, receive a short management frame sent by the STA and then continue to communicate on the wireless channel by using remaining transmission durations of the TXOP, and wherein the short management frame indicates that the STA has completed communication on the wireless channel.

Example 27 includes the apparatus of Example 24, wherein the processor circuitry is further configured to: when none of the one or more STAs accesses the wireless channel after a first predetermined time from the start of the preemption period, determine that none of the one or more STAs gains the wireless channel during the preemption period.

Example 28 includes the apparatus of Example 24, wherein the processor circuitry is further configured to: when a Clear Channel Assessment (CCA) result for the wireless channel indicates that the wireless channel is idle after a second predetermined time from the start of the preemption period, determining that none of the one or more STAs gains the wireless channel during the preemption period.

Example 29 includes the apparatus of Example 28, wherein the processor circuitry is further configured to: detect a frame containing a Short Training Field (STF), the STF and a Long Training Field (LTF), or a full legacy preamble comprising the STF, the LTF and a signal field (SIG); and obtain the CCA result for the wireless channel based on the frame including STF, the STF and the LTF, or the full legacy preamble.

Example 30 includes an apparatus, comprising processor circuitry configured to: receive information about a Transmission Opportunity (TXOP), wherein the TXOP comprises two or more transmission durations and a preemption period exists between any two neighboring transmission durations of the two or more transmission durations; and during the preemption period, preempt a wireless channel, which is originally occupied by a holder station (STA) of the TXOP, to transmit high priority traffic.

Example 31 includes the apparatus of Example 30, wherein the processor circuitry is further configured to: receive information about a Network Allocation Vector (NAV) along with the information about the TXOP.

Example 32 includes the apparatus of Example 30, wherein the processor circuitry is further configured to: when the wireless channel is preempted, communicate on the wireless channel by using a new TXOP.

Example 33 includes the apparatus of Example 32, wherein the new TXOP is 2 ms.

Example 34 includes the apparatus of Example 33, wherein the processor circuitry is further configured to: set a new Network Allocation Vector (NAV) to 2 ms.

Example 35 includes the apparatus of Example 34, wherein the processor circuitry is further configured to: when the NAV is a duration of the whole of the TXOP, transmit a short management frame to the holder STA of the TXOP after completing communication on the wireless channel by using the new TXOP, such that the holder STA of the TXOP continues to communicate on the wireless channel by using remaining transmission durations of the TXOP.

Example 36 includes the apparatus of Example 30, wherein the apparatus is implemented in a competing STA, the processor circuitry is further configured to preempt the wireless channel by transmitting data on the wireless channel when a backoff counter of the competing STA reaches zero, and the backoff counter starts to decrease after a third predetermined time from the start of the preemption period.

Example 37 includes the apparatus of Example 36, wherein the processor circuitry is further configured to transmit the data following a Request To Send (RTS)/Clear To Send (CTS) handshake process.

Example 38 includes the apparatus of Example 30, wherein the apparatus is implemented in a competing STA, and the processor circuitry is further configured to preempt the wireless channel by: broadcasting a frame containing a Short Training Field (STF), the STF and a Long Training Field (LTF), or a full legacy preamble comprising the STF, the LTF and a signal field (SIG) after a fourth predetermined time from the start of the preemption period; and transmitting data on the wireless channel when a backoff counter of the competing STA reaches zero, wherein the backoff counter starts to decrease after a fifth predetermined time from the start of the preemption period.

Example 39 includes an apparatus, comprising: means for broadcasting information about a Transmission Opportunity (TXOP) on a wireless channel, wherein the TXOP comprises two or more transmission durations and a preemption period exists between any two neighboring transmission durations of the two or more transmission durations; and means for pausing communicating on the wireless channel during the preemption period to give opportunity for one or more stations (STAs) to preempt the wireless channel to transmit high priority traffic.

Example 40 includes the apparatus of Example 39, wherein the one or more STAs are all Access Point (AP) STAs, a predefined set of non-AP STAs, or non-AP STAs for one or more predetermined Access Categories (ACs).

Example 41 includes the apparatus of Example 39, wherein the one or more STAs comprise Access Point (AP) STAs and non-AP STAs and a backoff counter of the AP STAs is lower than that of the non-AP STAs.

Example 42 includes the apparatus of Example 39, wherein each of the two or more transmission durations is 2 ms and the apparatus further comprises: means for setting a Network Allocation Vector (NAV) to a duration of the whole of the TXOP or 2 ms; and means for broadcasting information about the NAV along with the information about the TXOP.

Example 43 includes the apparatus of Example 39, further comprising: means for when none of the one or more STAs gains the wireless channel during the preemption period, continuing to communicate on the wireless channel by using remaining transmission durations of the TXOP after the preemption period expires.

Example 44 includes the apparatus of Example 39, wherein the apparatus further comprises means for when any of the one or more STAs gains the wireless channel during the preemption period and the NAV is set to 2 ms, dropping the TXOP and contending for the wireless channel at the end of a new TXOP hold by the STA.

Example 45 includes the apparatus of Example 42, wherein the apparatus further comprises means for when any of the one or more STAs gains the wireless channel during the preemption period and the NAV is set to the duration of the whole of the TXOP, receiving a short management frame sent by the STA and then continuing to communicate on the wireless channel by using remaining transmission durations of the TXOP, wherein the short management frame indicates that the STA has completed communication on the wireless channel.

Example 46 includes the apparatus of Example 43, further comprising: means for when none of the one or more STAs accesses the wireless channel after a first predetermined time from the start of the preemption period, determining that none of the one or more STAs gains the wireless channel during the preemption period.

Example 47 includes the apparatus of Example 43, further comprising: means for when a Clear Channel Assessment (CCA) result for the wireless channel indicates that the wireless channel is idle after a second predetermined time from the start of the preemption period, determining that none of the one or more STAs gains the wireless channel during the preemption period.

Example 48 includes the apparatus of Example 47, further comprising: means for detecting a frame containing a Short Training Field (STF), the STF and a Long Training Field (LTF), or a full legacy preamble comprising the STF, the LTF and a signal field (SIG); and means for obtaining the CCA result for the wireless channel based on the frame including STF, the STF and the LTF, or the full legacy preamble.

Example 49 includes an apparatus, comprising: means for receiving information about a Transmission Opportunity (TXOP), wherein the TXOP comprises two or more transmission durations and a preemption period exists between any two neighboring transmission durations of the two or more transmission durations; and means for during the preemption period, preempting a wireless channel, which is originally occupied by a holder station (STA) of the TXOP, to transmit high priority traffic.

Example 50 includes the apparatus of Example 49, further comprising: means for receiving information about a Network Allocation Vector (NAV) along with the information about the TXOP.

Example 51 includes the apparatus of Example 49, further comprising: means for when the wireless channel is preempted, communicating on the wireless channel by using a new TXOP.

Example 52 includes the apparatus of Example 51, wherein the new TXOP is 2 ms.

Example 53 includes the apparatus of Example 49, further comprising: means for setting a new Network Allocation Vector (NAV) to 2 ms.

Example 54 includes the apparatus of Example 50, further comprising: means for when the NAV is a duration of the whole of the TXOP, transmitting a short management frame to the holder STA of the TXOP after completing communication on the wireless channel by using the new TXOP, such that the holder STA of the TXOP continues to communicate on the wireless channel by using remaining transmission durations of the TXOP.

Example 55 includes the apparatus of Example 49, wherein the apparatus is implemented in a competing STA and further comprises means for preempting the wireless channel by transmitting data on the wireless channel when a backoff counter of the competing STA reaches zero, and the backoff counter starts to decrease after a third predetermined time from the start of the preemption period.

Example 56 includes the apparatus of Example 55, further comprising: means for transmitting the data following a Request To Send (RTS)/Clear To Send (CTS) handshake process.

Example 57 includes the apparatus of Example 49, wherein the apparatus is implemented in a competing STA and further comprises means for preempting the wireless channel by: broadcasting a frame containing a Short Training Field (STF), the STF and a Long Training Field (LTF), or a full legacy preamble comprising the STF, the LTF and a signal field (SIG) after a fourth predetermined time from the start of the preemption period; and transmitting data on the wireless channel when a backoff counter of the competing STA reaches zero, wherein the backoff counter starts to decrease after a fifth predetermined time from the start of the preemption period.

Example 58. A computer readable medium storing instructions thereon, the instructions, when executed by one or more processors, cause the one or more processors to implement the method of any of Examples 1-19.

Although certain embodiments have been illustrated and described herein for purposes of description, a wide variety of alternate and/or equivalent embodiments or implementations calculated to achieve the same purposes may be substituted for the embodiments shown and described without departing from the scope of the disclosure. This application is intended to cover any adaptations or variations of the embodiments discussed herein. Therefore, it is manifestly intended that embodiments described herein be limited only by the appended claims and the equivalents thereof.

What is claimed is:

1. A method used in a communication station, wherein the communication station is an Access Point (AP) or a non-AP station (non-AP STA), the method comprising:
    broadcasting information about a Transmission Opportunity (TXOP) on a wireless channel, wherein the TXOP comprises two or more transmission durations and a preemption period exists between any two neighboring transmission durations of the two or more transmission durations; and
    pausing communicating on the wireless channel during the preemption period to give opportunity for one or more stations (STAs) to preempt the wireless channel to transmit high priority traffic, wherein
    each of the two or more transmission durations is 2 ms and the method further comprises:
    setting a Network Allocation Vector (NAV) to a duration of the whole of the TXOP or 2 ms; and
    broadcasting information about the NAV along with the information about the TXOP.

2. The method of claim 1, wherein the one or more STAs are all Access Point (AP) STAs, a predefined set of non-AP STAs, or non-AP STAs for one or more predetermined Access Categories (ACs).

3. The method of claim 1, wherein the one or more STAs comprise Access Point (AP) STAs and non-AP STAs and a backoff counter of the AP STAs is lower than that of the non-AP STAs.

4. The method of claim 1, further comprising:
    when none of the one or more STAs gains the wireless channel during the preemption period, continuing to communicate on the wireless channel by using remaining transmission durations of the TXOP after the preemption period expires.

5. The method of claim 1, wherein when any of the one or more STAs gains the wireless channel during the preemption period and the NAV is set to 2 ms, the method further comprises:
    dropping the TXOP and contending for the wireless channel at the end of a new TXOP hold by the STA.

6. The method of claim 1, wherein when any of the one or more STAs gains the wireless channel during the preemption period and the NAV is set to the duration of the whole of the TXOP, the method further comprises:
    receiving a short management frame sent by the STA and then continuing to communicate on the wireless channel by using remaining transmission durations of the TXOP, wherein the short management frame indicates that the STA has completed communication on the wireless channel.

7. The method of claim 4, further comprising:
when none of the one or more STAs accesses the wireless channel after a first predetermined time from the start of the preemption period, determining that none of the one or more STAs gains the wireless channel during the preemption period.

8. The method of claim 4, further comprising:
when a Clear Channel Assessment (CCA) result for the wireless channel indicates that the wireless channel is idle after a second predetermined time from the start of the preemption period, determining that none of the one or more STAs gains the wireless channel during the preemption period.

9. The method of claim 8, further comprising:
detecting a frame containing a Short Training Field (STF), the STF and a Long Training Field (LTF), or a full legacy preamble comprising the STF, the LTF and a signal field (SIG); and
obtaining the CCA result for the wireless channel based on the frame including STF, the STF and the LTF, or the full legacy preamble.

10. A method used in a communication station, wherein the communication station is an Access Point (AP) or a non-AP station (non-AP STA), the method comprising:
receiving information about a Transmission Opportunity (TXOP), wherein the TXOP comprises two or more transmission durations and a preemption period exists between any two neighboring transmission durations of the two or more transmission durations;
during the preemption period, preempting a wireless channel, which is originally occupied by a holder station (STA) of the TXOP, to transmit high priority traffic; and
when the wireless channel is preempted, communicating on the wireless channel by using a new TXOP, wherein the new TXOP is 2 ms.

11. The method of claim 10, further comprising:
receiving information about a Network Allocation Vector (NAV) along with the information about the TXOP.

12. The method of claim 10, further comprising:
setting a new Network Allocation Vector (NAV) to 2 ms.

13. The method of claim 12, wherein when the NAV is a duration of the whole of the TXOP, the method further comprises:
transmitting a short management frame to the holder STA of the TXOP after completing communication on the wireless channel by using the new TXOP, such that the holder STA of the TXOP continues to communicate on the wireless channel by using remaining transmission durations of the TXOP.

14. The method of claim 10, wherein the method is implemented by a competing STA, the preempting comprises transmitting data on the wireless channel when a backoff counter of the competing STA reaches zero, and the backoff counter starts to decrease after a third predetermined time from the start of the preemption period.

15. The method of claim 14, wherein the transmitting is implemented following a Request To Send (RTS)/Clear To Send (CTS) handshake process.

16. The method of claim 10, wherein the method is implemented by a competing STA, and the preempting comprises:
broadcasting a frame containing a Short Training Field (STF), the STF and a Long Training Field (LTF), or a full legacy preamble comprising the STF, the LTF and a signal field (SIG) after a fourth predetermined time from the start of the preemption period; and
transmitting data on the wireless channel when a backoff counter of the competing STA reaches zero, wherein the backoff counter starts to decrease after a fifth predetermined time from the start of the preemption period.

17. An apparatus used in a communication station, wherein the communication station is an Access Point (AP) or a non-AP station (non-AP STA), the apparatus comprising processor circuitry configured to:
broadcast information about a Transmission Opportunity (TXOP), wherein the TXOP comprises two or more transmission durations and a preemption period exists between any two neighboring transmission durations of the two or more transmission durations; and
pause communicating on a wireless channel during the preemption period to give opportunity for one or more stations (STAs) to preempt the wireless channel to transmit high priority traffic, wherein
each of the two or more transmission durations is 2 ms and the processor circuitry is further configured to:
set a Network Allocation Vector (NAV) to a duration of the whole of the TXOP or 2 ms; and
broadcast information about the NAV along with the information about the TXOP.

18. The apparatus of claim 17, wherein the one or more STAs comprise Access Point (AP) STAs and non-AP STAs and a backoff counter of the AP STAs is lower than that of the non-AP STAs.

19. The apparatus of claim 17, wherein the processor circuitry is further configured to: when none of the one or more STAs gains the wireless channel during the preemption period, continue to communicate on the wireless channel by using remaining transmission durations of the TXOP after the preemption period expires.

20. The apparatus of claim 17, wherein the processor circuitry is further configured to: when any of the one or more STAs gains the wireless channel during the preemption period and the NAV is set to 2 ms, drop the TXOP and contend for the wireless channel at the end of a new TXOP hold by the STA.

21. The apparatus of claim 17, wherein the processor circuitry is further configured to: when any of the one or more STAs gains the wireless channel during the preemption period and the NAV is set to the duration of the whole of the TXOP, receive a short management frame sent by the STA and then continue to communicate on the wireless channel by using remaining transmission durations of the TXOP, and wherein the short management frame indicates that the STA has completed communication on the wireless channel.

* * * * *